United States Patent [19]

Elholm

[11] Patent Number: 5,532,975
[45] Date of Patent: Jul. 2, 1996

[54] DEVICE AND METHOD FOR POSITIONING OF TOWING SYSTEMS FOR USE IN MARINE SEISMIC SURVEYS

[75] Inventor: Tor Elholm, Hosle, Norway

[73] Assignee: Geco A.S., Stavanger, Norway

[21] Appl. No.: 194,377

[22] Filed: Feb. 8, 1994

[30] Foreign Application Priority Data

Feb. 23, 1993 [NO] Norway .................................. 930641

[51] Int. Cl.$^6$ ............................ G01V 1/38; B63B 21/66
[52] U.S. Cl. .................. 367/16; 114/244; 367/20
[58] Field of Search ............................ 367/16, 17, 18, 367/20, 106; 114/244, 245, 246

[56] References Cited

U.S. PATENT DOCUMENTS

| | | | |
|---|---|---|---|
| 3,434,451 | 3/1969 | Brainard, II | 367/18 |
| 3,605,674 | 9/1969 | Weese | 114/235 B |
| 3,774,570 | 11/1973 | Pearson | 114/235 B |
| 4,063,213 | 12/1977 | Itria et al. | 367/17 |
| 4,087,780 | 5/1978 | Itria et al. | 367/17 |
| 4,227,479 | 10/1980 | Gertler et al. | 114/244 |
| 4,323,989 | 4/1982 | Huckabee et al. | 367/17 |
| 4,404,664 | 9/1983 | Zachariadis | 367/19 |
| 4,463,701 | 8/1984 | Pickett et al. | 114/245 |
| 4,484,534 | 11/1984 | Thillaye duBoullay | 114/244 |
| 4,723,501 | 2/1988 | Hovden et al. | 367/16 |
| 4,729,333 | 3/1988 | Kirby et al. | 114/244 |
| 4,890,568 | 1/1990 | Dolengowski | 114/246 |
| 5,052,814 | 10/1991 | Stubblefield | 367/16 |
| 5,357,892 | 10/1994 | Vatne et al. | 114/244 |
| 5,402,745 | 4/1995 | Wood | 114/244 |
| 5,443,027 | 8/1995 | Owsley et al. | 114/244 |

FOREIGN PATENT DOCUMENTS

| | | |
|---|---|---|
| 0018053 | 10/1980 | European Pat. Off. . |
| 0154968 | 9/1985 | European Pat. Off. . |
| 2223798 | 9/1973 | Germany . |
| 3737490 | 4/1992 | Germany . |
| 151735 | 2/1985 | Norway . |
| 158970 | 8/1988 | Norway . |
| 1104454 | 7/1984 | U.S.S.R. ........................ 367/16 |
| 1551635 | 8/1979 | United Kingdom . |
| 2193476 | 2/1988 | United Kingdom . |
| 2248587 | 4/1992 | United Kingdom . |

*Primary Examiner*—Charles T. Jordan
*Assistant Examiner*—Theresa M. Wesson
*Attorney, Agent, or Firm*—Jacobson, Price, Holman & Stern

[57] ABSTRACT

A positioning device for seismic equipment which is towed by a seismic vessel is designed with a body part which is equipped with wings (7) and rudders (8, 6, 9, 5). For the control of wings (7) and rudders (8, 6, 9, 5) control means, preferably hydraulic or electrical means are used. The device further comprises a control unit for processing of signals which preferably operate exclusively on the basis of information from the vessel or the ship, instruments for use in the positioning of the device and a communication system for the communication between the vessel and the device and vice versa, preferably electrical, acoustic or optical. It is further equipped with attachment devices for one or more cables (26) and floats, which are preferably provided at the front of the device, and preferably in the vicinity of the wing's (7) attachment point to the device's body part as well as a power supply system.

24 Claims, 5 Drawing Sheets

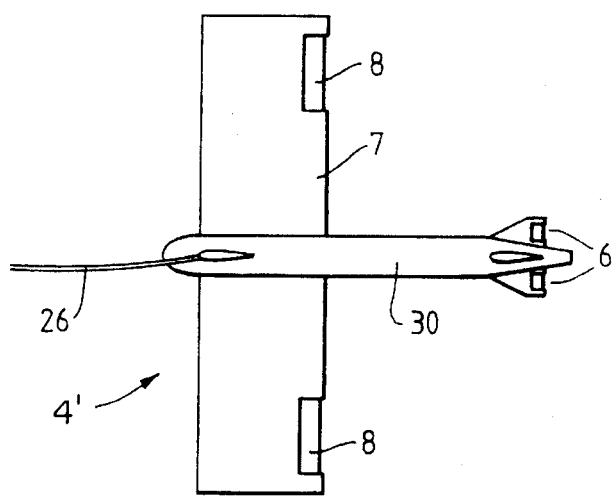
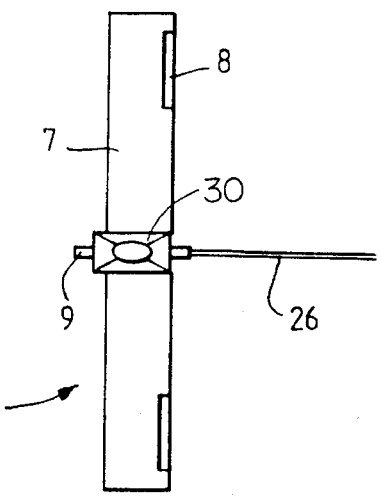
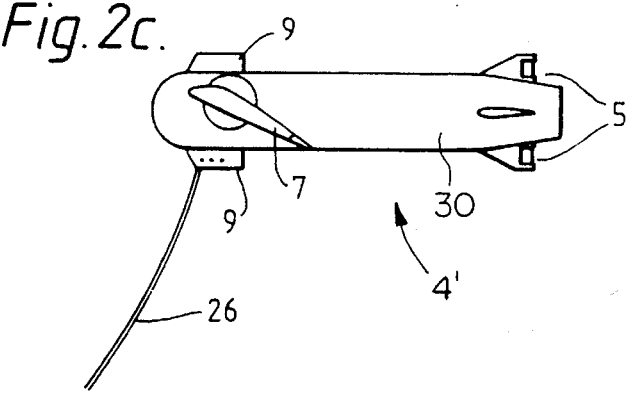
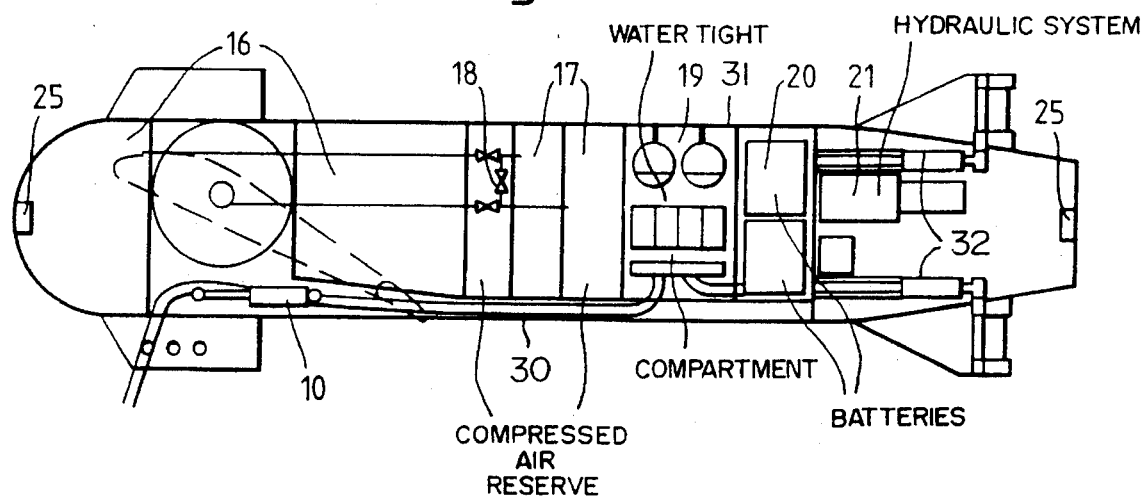

DEVICE AND METHOD FOR POSITIONING OF TOWING SYSTEMS FOR USE IN MARINE SEISMIC SURVEYS

BACKGROUND OF THE INVENTION

The present invention is concerned with seismic surveys. More specifically it concerns a device for, and a method for towing a seismic tow, consisting of a gun array and seismic streamers.

In marine seismic surveys a ship is used which tows seismic sources and seismic streamers. The sources produce acoustic energy which is propagated in the geological formations below the seabed where the survey is undertaken. The sound pulse or shock wave generated by the sources is reflected as acoustic waves. The seismic streamer consists of hydrophones which detect the reflected acoustic waves, convert the signals to electrical pulses, and pass on this information to a data acquisition system on board the vessel. Further processing and analysis of the information give an indication of the structure in the geological formations in which the survey has been conducted.

A seismic source consists of a number of individual sound sources, e.g. airguns or waterguns. An arrangement of individual guns is usually called a gun array. Apart from the actual guns a gun array also includes attachment devices, air hoses, electrical wires and sensors. A gun array measures 10–30 meters in length.

A seismic streamer, often called a hydrophone cable, consists mainly of hydrophones for the detection of acoustic waves, electronic modules, electrical wires and sensors apart from the actual framework. Seismic streamers are divided into sections approximately 100 meters in length, and have a total length of 2,000–6,000 meters.

A seismic tow or a seismic towing system consists of seismic streamers and seismic sources. A common feature of these units is that they can be positioned astern of and to the side of the ship's line of travel. In addition they are submerged in the ship's line of travel. In addition they are submerged in the water, the gun arrays at a depth of 5–15 meters below the surface and the streamers at a depth of 5–40 meters.

None of the above figures are absolute, and can, of course, vary outside those limits given here.

Seismic towing systems are becoming progressively more complex, i.e. they are composed of more sources and streamers. Increasing demands are also being made on the efficiency of a towing system. The efficiency can usually be measured on the basis of the extent of coverage obtained by a seismic tow. The coverage will be dependent on the width of the tow. One of the factors to which particular importance is attached is the positioning of the seismic tow. The quality of the collected data is dependent on how accurately the towing system has been positioned. In this context the term positioned refers to how each unit in the towing system, sources and streamers is positioned in relation to the others in the longitudinal and width directions.

One of the existing methods for positioning of seismic equipment which can be mentioned, is the use of otter-like devices with one or more foils. The otter is connected with a float on the surface, and by means of foils will guide a tow out to the side. There are several variations of the otter device. One known method is to have an individual foil or wing which can be mounted directly on to the streamer which has to be controlled. This type of otter device is also dependent on connection to a float on the surface.

Another method is to use surface bodies or vessels which are provided in such a manner that the vessel is towed at an angle, thus achieving a lateral force. Examples of this type of vessel which can be envisaged are vessels which are equipped with a tilted keel, or tilted foils, thus enabling the surface vessel to move out to the side.

The common feature of these methods and the equipment for obtaining a certain width for the towing system is that they all have a connection with the surface. This makes the vessels particularly vulnerable to flotsam. In the event of a collision between a vessel and some flotsam the towing system or parts of it will often be damaged. In a collision with flotsam the vessel could change direction, thus causing large sections of the towing system to be damaged. The same thing will happen if it comes into contact with fishing tackle or other equipment which may be in the location of the tow.

Another problem is that surface vessels or floats cause a great deal of friction. Severe friction gives rise to two problems in particular; increased fuel expenses and increased difficulty in obtaining tow width. The same will apply to the actual connection consisting of wires, rope, chains or the like between the gun array and the surface vessel or float, and the connection between the cable and the surface vessel or the float.

The fact that the gun arrays and the streamers are connected with the surface will cause waves to be generated. This gives rise to unwanted noise and vibrations for the towed equipment. In some cases there will also be problems with maintaining the equipment at a constant depth, especially when the survey is being conducted in heavy seas. It is also a problem to keep the equipment on the correct course, with the equipment usually drifting in step with the waves.

It is obvious that the equipment is subject to a considerable degree of wear and tear and damage when it is exposed to those forces which are associated with a connection with the surface.

SUMMARY OF THE INVENTION

The object of the present invention is to avoid the above-mentioned problems, and to employ a positioning unit or vessel for gun arrays and streamers and a method for towing sources and streamers whose purpose is to achieve an efficient and correctly-positioned tow.

In more precise terms one of the objects of the invention is to reduce the friction in a seismic tow.

A second object is to reduce the noise which results from the influence of surface and wave noise on the equipment. A third object of the invention is to reduce wear and tear and damage to the towing system.

A fourth object is to obtain the greatest possible width or separation of the equipment which is being towed in order thereby to increase the efficiency.

A further object of the invention is to protect the equipment from objects floating in the water which can cause damage to the towing equipment.

These objects are achieved by a device, generally called a positioning unit or a vessel, which comprises a body part to which are attached at least two fairly large wings with a balance rudder or a large wing called a main wing. At the rear of the body part there is located a rudder or tail rudder. Both wings and rudder are adjustable and are thus equipped with control bodies. On the front part of the body there is provided a stabilizer rudder which can also be adjustable.

The interior of the positioning unit consists among other things of a power receiver part and battery. Furthermore instruments in the form of an inclinometer, a compass, pressure transmitters and pitot pressure transmitters are located in a compartment in the body part. Both these compartments, the compartment for instruments and the compartment where batteries are located are watertight. Common components for the control bodies, in this case the hydraulic system, are located in a compartment in the body part. In addition the actual body of the positioning unit can have one or more ballast tanks or buoyancy tanks with associated air supply system, together with a compressed air compartment. The vessel is also equipped with acoustic positioning equipment. This equipment consists of hydrophones and transducers which transmit and receive sound in such a manner that it is possible to calculate the distance between the units in the towing system. Electrical cables are provided between the ship and the positioning unit. Communication to and from the vessel is conducted by transmitting electrical pulses, acoustic pulses or by another appropriate method for the transmission of information.

The device has a control unit for the control of information and the control body.

In each wing there can be provided buoyancy tanks with associated air supply system and valves.

The objects of the invention are achieved by the employment of a method which uses the vessel according to the invention in order to position a seismic tow consisting of sources and streamers. By having the vessel located in the water astern of the ship and together with the streamers and sources which have to be towed, the vessel will be able to position the gun array or cables. Control signals are transmitted to the vessel via a central source or a computer programme on board the ship, and information from the various instruments is transmitted from the vessel to the boat. On the basis of given parameters concerning depth, pressure, speed, separation out to the side, etc., a computer programme will be able to calculate which control signals should be transmitted to the vessel in order to guide it into the correct position. The calculation of the optimum position for the device can also be performed internally in the vessel. The position of the wings, tail rudder, stabilizer rudder and ballast tanks will ensure the correct adjustment of the positioning unit at all times. The ballast tanks will give the vessel a positive static buoyancy. This is essential in order to prevent the vessel from sinking in the event of something unforseen happening such as the towing system no longer moving forwards.

BRIEF DESCRIPTION OF THE DRAWINGS

The positioning unit or vessel according to the invention is illustrated in the drawings, where FIG. 2a is a principle or side view of the device, FIG. 2b is a front view of the device, FIG. 2c illustrates the vessel viewed from above, FIG. 3 illustrates the vessel viewed from above, and with an view of how the vessel looks inside.

DESCRIPTION OF THE PREFERRED EMBODIMENTS

Figure 1:
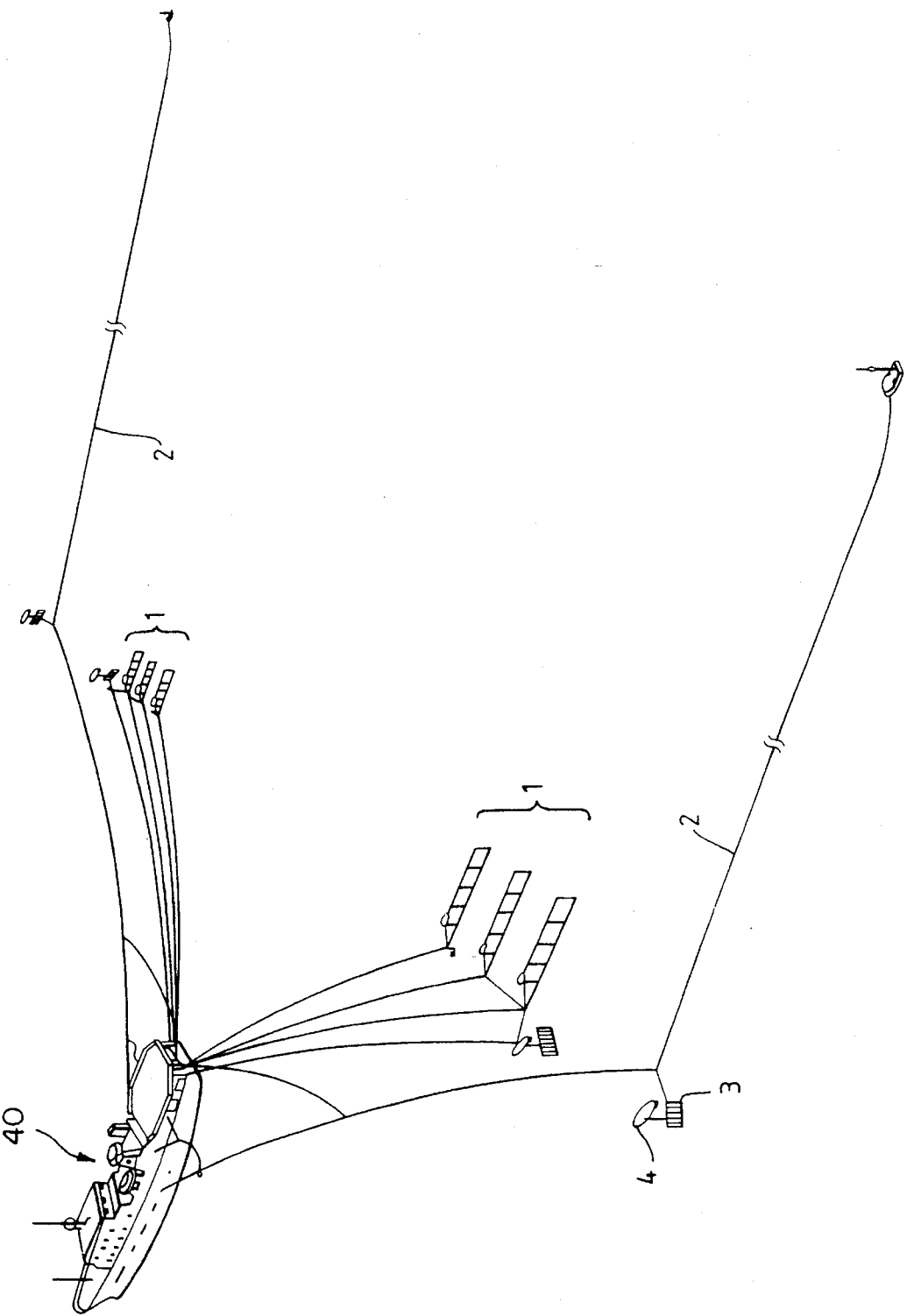
FIG. 1 shows a marine seismic survey system.

FIG. 1 illustrates a known embodiment of a marine seismic survey system. The drawing shows that in this case a vessel is used which has a towing system or tow consisting of two streamers (2) and two sources (1), each consisting of 3 gun arrays. An otterboard (3) with several foils produces the lateral force, thus causing the equipment to be pulled out to the side of the ship's (40) line of travel. Due to the weight of the towed equipment and the otterboard, a float (4) is provided which is placed on the sea surface and keeps the whole system at a specific depth below the surface of the sea.

FIG. 2 illustrates the device according to the invention. FIG. 2a is a principal/side view of the vessel (4'). It comprises a body part (30), wings (7) with balance rudder (8) and tail rudder (6). FIG. 2b is a front view of the positioning unit, in which the stabilizer rudders (9) are provided. In FIG. 2c these rudders (9) are illustrated even more clearly. A view from above also provides a picture of the two other tail rudders (5). The cable (26) is the cable or connection, which the vessel (4')has with the towed equipment or with the ship.

FIG. 3 shows the design of the actual body of the vessel (4') according to the invention. The solution illustrated in the drawing is an example of how the body of the vessel is designed and arranged. The solution is not intended to be restricted to this form and layout, thus enabling vessels with a different solution to fall within the scope of the invention.

In the vessel's forward and aft end there is provided acoustic positioning equipment (25). The positioning equipment comprises transducers and hydrophones, which transmit and receive sound. On this basis distances between the units in the towing equipment can be calculated. In addition to the positioning equipment, instruments are provided in a watertight compartment (19) for use in positioning the vessel (4'). The instruments involved are an inclinometer, a compass, static pressure transmitters, pitot pressure transmitters and other pressure transmitters. In addition there are transmitters which can record angle deflection on wings and rudders. There is a hydraulic system which operates the position of the adjustable parts of the vessel (4'). Common components for the hydraulic system such as pumps, oil, control valves are located in a compartment (21). In the same compartment there are provided cylinders (32) for the adjustment of the tail rudders (5) and (6). A power supply is required for the electrical system. The power supply is partly transmitted from the towing cable directly to the electrical system, but batteries (20) are also provided in a watertight compartment (31). The batteries are located in the vessel (4') as a reserve and supplementary power supply. There are two sizeable ballast tanks or buoyancy tanks (16) in the vessel (4'). These will take in water as soon as the vessel (4') is placed in the water. If extra buoyancy is required, these tanks can be filled with air. The air is transported from the compressed air reserve in a compartment (17) on board the vessel (4') via air pipes to either the ballast tanks in the actual body part of the vessel (4') or to the ballast or buoyancy tanks in the wings. A valve (18) is provided between the air supply to the wings and the air supply to the reserve tanks in the body part of the vessel (4'). The wings are moved by two parallel cylinders (10). These are provided with the wing trunnion (12) illustrated in FIG. 4.

Figure 4:
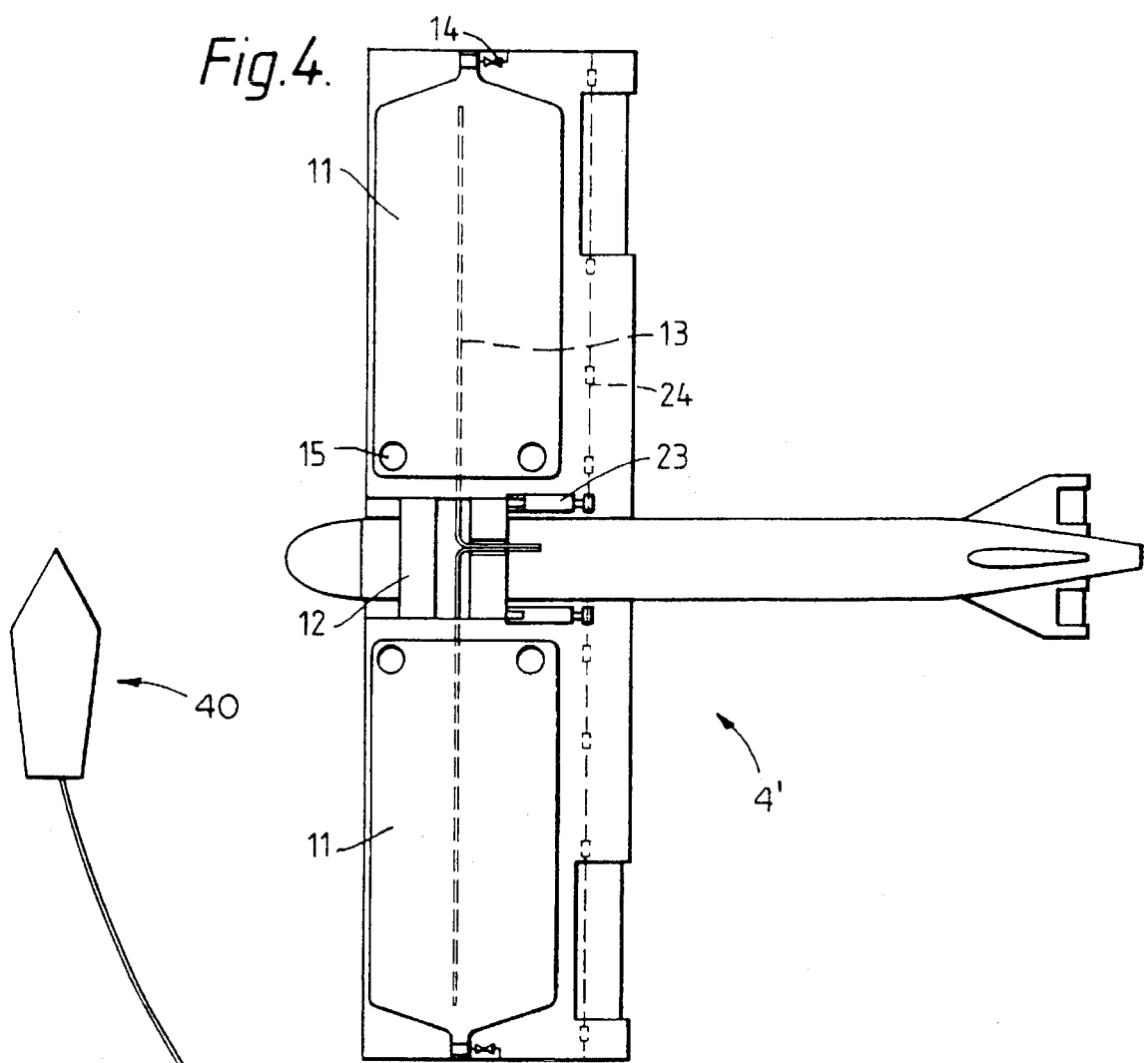
FIG. 4 is a side view of the vessel, and particularly illustrates how the wings are arranged.

FIG. 4 also illustrates how each of the wings is provided with a buoyancy tank (11). An air pipe (13) is provided in order to supply air to the tanks, which are otherwise filled with water through open inlets (15). In order to be able to regulate the amount of air or water in the wing tanks, a valve (14) has been located on the outside edge of the wings. The tip of the wing which has to regulate the buoyancy will always point upwards. The air, of course, will always be at the top of the tank. Thus no valve is required in order to close off the inflow of water. The water will flow in and out of the holes (15), depending on how much air is blown into or released from the tank in the wing. The balance rudders (8) are regulated via the cylinders (23). The cylinders are located inside the wings, closest to the body. A shaft (24) ensures that the force is transferred to the balance rudders.

The vessel (4') will be "open" to water, thus permitting the free flow of water in and out of the vessel, apart from the two watertight compartments which are designed for battery or power supply, and the compartment in which the instruments are located. The advantage of having a through-flow of water in the vessel is that the vessel thereby becomes heavy in water and light in air, a feature which is advantageous when the vessel has to be deployed into the water and recovered on to the ship's (40) deck.

Hydraulic control is used for control of the movable parts of the vessel (4'), wings and rudders. The pump which generates the oil pressure is electrically operated. A completely electrically operated control system can be used. The power supply is by means of electrical cables from the ship (40). This is already a tried and tested technique. Batteries are located in the vessel (4') in order to cover an unexpected power requirement for a limited period. The batteries will be charged from the power supply from the ship (40) to the vessel (4').

Even though the vessel (4') will be steered mainly from the ship's (40) central control system, the vessel (4') itself will be able to adjust its course by means of its own control loops, on the basis of information from angle indicators, pressure transmitters, speed transmitters, depth gauges, positioning instruments and other instruments installed in the vessel (4') in order to provide as accurate positioning as possible.

A method for positioning of the vessel (4') will be either by directly mounting it on gun arrays or streamers, or via a float which has slightly less buoyancy than the weight of that which is to be towed from the float. It will therefore be submerged in the water, but still take most of the weight from the towed equipment. An important purpose of this float is that it prevents vibrations and noise from the towing cables from propagating further to the streamers or gun arrays. The reason for this is that the underwater float will provide a change in impedance, thus causing the vibrations to be reflected instead of being passed on to the towing equipment.

Figure 5:
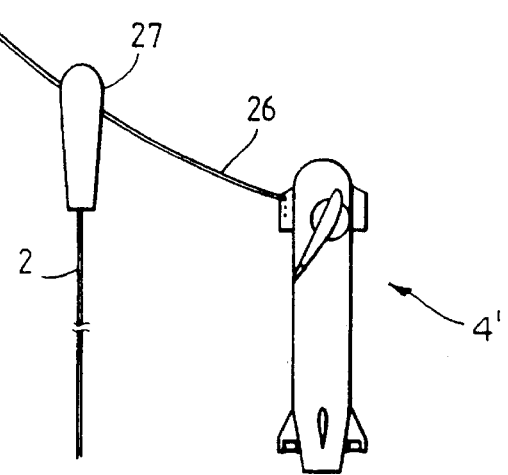
FIG. 5 illustrates a tow of a streamer, where the tow is viewed from above.
Figure 6:
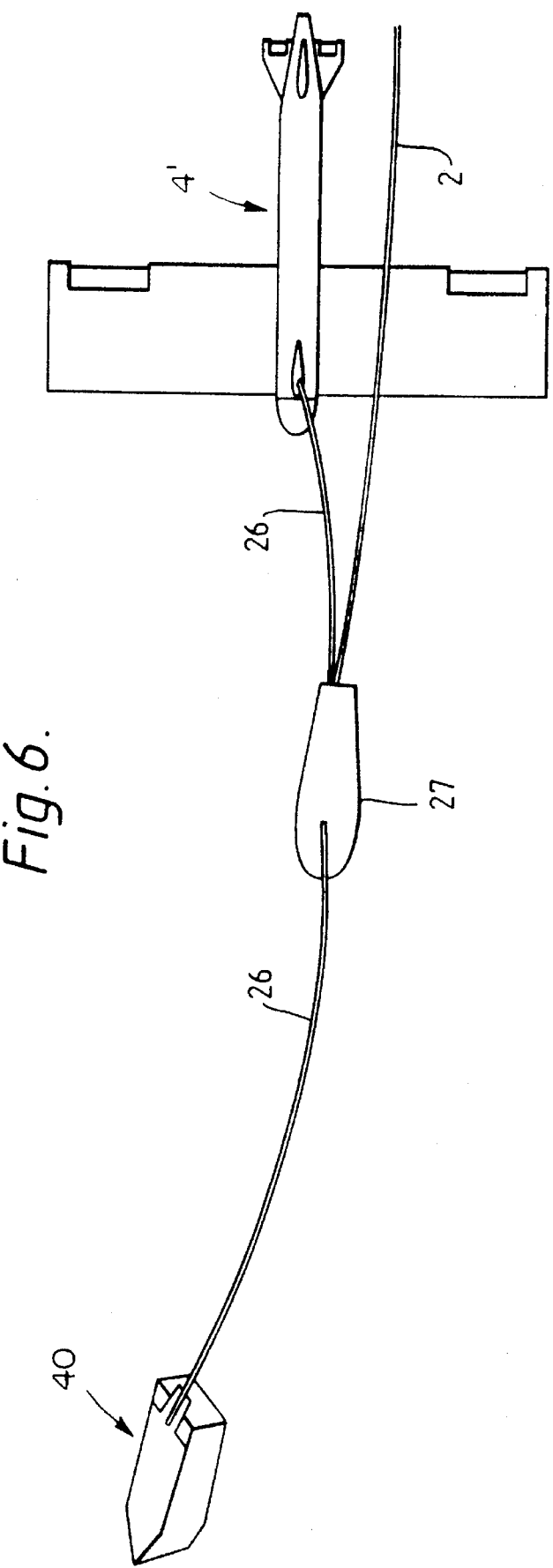
FIG. 6 illustrates a tow of a gun array or a streamer viewed from the side according to the invention.

FIGS. 5 and 6 are a drawing of a tow viewed from above in FIG. 5 and from the side in FIG. 6. The figures illustrate how one possible application of the positioning unit is envisaged. In this case an underwater float (27) is used as a junction for the towing cable to the ship (40), the towing cable to the actual hydrophone cable, and the towing point to the vessel (4') which pulls the whole system out to the side.

Figure 7:
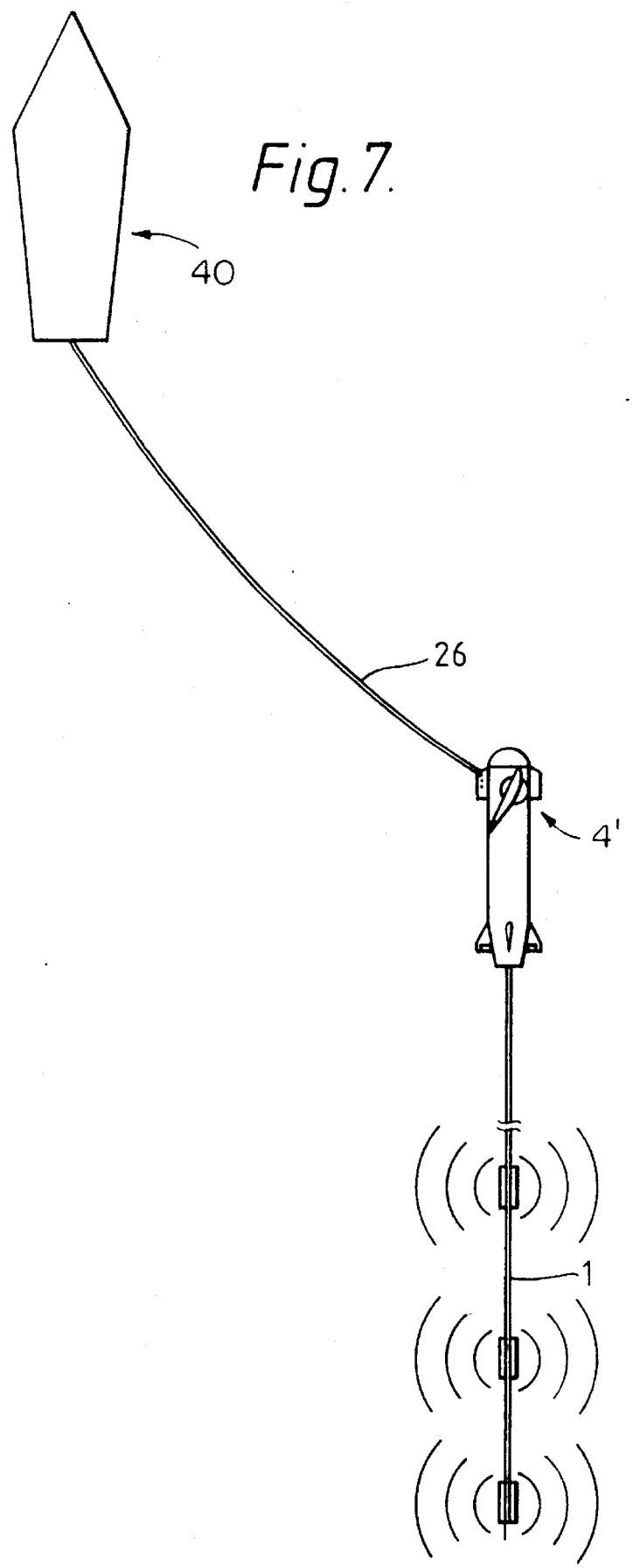
FIG. 7 illustrates a towing system according to the invention, where the towing of a gun array is illustrated. The towing system is viewed from above.

FIG. 7 is an example of a tow viewed from above, where an underwater float is not used, but the vessel is connected directly to the equipment which has to be towed and pulled out to the side.

The figures and their descriptions illustrate only one embodiment of the invention. There will be many possible modifications and variations within the scope of the invention and the patent claims.

I claim:

1. A device for positioning of seismic equipment in a desired underwater position when towed by a seismic vessel, said device including a mechanism for placement underwater and for maintaining said desired underwater position, said mechanism comprising:

a body part equipped with wings and rudders, a control body for controlling the wings and rudders so as to achieve said desired underwater position, instruments for use in positioning the device in said desired underwater position, a communication system for communicating between the seismic vessel and the device, a control unit for processing signals which operate on the basis of information from at least one of two locations, said two locations consisting of the seismic vessel and said instruments an attachment device for at least one cable and at least one float, and a power supply system.

2. The device according to claim 1, wherein said device is perforated to enable water to flow in and out of the device, and wherein said device further comprises watertight compartments, which are not perforated, for holding said instruments.

3. The device according to claim 1, wherein said wings have at least one opening for the flow of water, said at least one opening being located immediately adjacent to said body part.

4. The device according to claim 1, wherein said wings are located on a front part of the device.

5. The device according to claim 1, and further comprising buoyancy tanks with an associated air supply system and valves, including a source of compressed air in the device for supplying air to said buoyancy tanks via a pipe system of said associated air supply system.

6. The device according to claim 1, characterized in that at least one of said wings has a balance rudder.

7. The device according to claim 1, wherein at least one of said wing has at least one buoyancy tank with a valve located in an outer edge of said at least one of said wings.

8. The device according to claim 1, wherein the control unit governs the control body and transmits and receives information between the seismic vessel and the device.

9. A method for positioning of seismic equipment in a desired underwater position when towed by a seismic vessel, said method comprising the steps of:

attaching a positioning device to a front part of a towing cable, said positioning device including a mechanism for placement underwater and for maintaining said desired underwater position, said mechanism comprising:

a body part equipped with wings and rudders, a control body for controlling the wings and rudders so as to achieve said desired underwater position, instruments for use in positioning the device in said desired underwater position, a communication system for communicating between the seismic vessel and the device, a control unit for processing signals which operate on the basis of information from at least one of two locations, said two locations consisting of the seismic vessel and said instruments, an attachment device for at least one cable and at least one float, and a power supply system;

placing said positioning device underwater; and controlling said positioning device using control signals which are calculated in at least one of said two locations, said controlling of said positioning device being performed so that said positioning device achieves the desired underwater position.

10. The method according to claim 9, and further comprising the step of attaching said device directly to towing equipment.

11. The device according to claim 1, wherein said control body is hydraulic.

12. The device according to claim 1, wherein said control body is electrical.

13. The device according to claim 1, wherein said communication system is electrical.

14. The device according to claim 1, wherein said communication system is acoustic.

15. The device according to claim 1, wherein said communication system is optical.

16. The device according to claim 1, wherein said at least one cable and said at least one float are provided at a front portion of the device.

17. The device according to claim 1, wherein said at least one cable and said at least one float are provided in the vicinity of points of said body part where said wings are attached.

18. The device according to claim 1, wherein at least one of said rudders is arranged in a vertical plane and at least one of said rudders is arranged in a horizontal plane.

19. The device according to claim 1, wherein said rudders are located at at least one of two longitudinal end portions of said body part.

20. The device according to claim 1, wherein at least one of said wings has a balance rudder in an outer edge of said at least one wing.

21. The method according to claim 9, and further comprising the step of attaching said device to towing equipment via a junction.

22. The method according to claim 21, wherein said junction is an underwater float.

23. The method according to claim 9, and further comprising the step of attaching said device to a surface float.

24. The method according to claim 9, and further comprising the step of attaching said device to an underwater float.

* * * * *